United States Patent
Lee et al.

(10) Patent No.: US 12,369,208 B2
(45) Date of Patent: Jul. 22, 2025

(54) SEAMLESS COMMUNICATION TRANSITIONS FOR SHORT-RANGE NETWORK DEVICES

(71) Applicant: MOTOROLA SOLUTIONS, INC., Chicago, IL (US)

(72) Inventors: Chun Hock Lee, Kedah (MY); Khairul Azhar Abu Bakar, Penang (MY); Alfy Merican Ahmad Hambaly, Penang (MY); Chew How Lim, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 445 days.

(21) Appl. No.: 18/147,971

(22) Filed: Dec. 29, 2022

(65) Prior Publication Data
US 2024/0224351 A1    Jul. 4, 2024

(51) Int. Cl.
*H04W 76/14* (2018.01)
*H04W 76/19* (2018.01)

(52) U.S. Cl.
CPC .......... *H04W 76/14* (2018.02); *H04W 76/19* (2018.02)

(58) Field of Classification Search
CPC ........ H04W 76/14; H04W 76/19; G08G 1/20; B60W 2420/403; B60W 2420/408; G01S 7/003; G01S 13/865; G01S 13/867; B60Q 5/005; B60Q 9/00; G08B 13/19641; G08B 13/19647; G08B 13/187
See application file for complete search history.

(56) References Cited

U.S. PATENT DOCUMENTS

| | | | |
|---|---|---|---|
| 7,624,185 B2 | 11/2009 | Miller | |
| 8,478,276 B1 | 7/2013 | Koren et al. | |
| 9,571,955 B1 | 2/2017 | Mohdi et al. | |
| 10,327,127 B2 | 6/2019 | Zhao et al. | |
| 10,887,808 B1 | 1/2021 | McPhee et al. | |
| 12,187,288 B1* | 1/2025 | Arnicar | B60W 60/001 |
| 2014/0125525 A1 | 5/2014 | Kane et al. | |

(Continued)

OTHER PUBLICATIONS

Apple Support, "Switch your AirPods to another device," <https://support.apple.com/en-my/HT212204>, webpage published Oct. 24, 2022 (3 pages).

*Primary Examiner* — Cindy Trandai
(74) *Attorney, Agent, or Firm* — Michael Best & Friedrich LLP

(57) ABSTRACT

A mobile communication system that includes a short-range communication device, a mobile communication device, and a vehicle-based communication device configured to communicate with the short-range communication device. The system includes a sensor configured to generate sensor data and an electronic processor connected to the sensor and configured to receive sensor data that is associated with a scene external to a vehicle, detect an object based on the received sensor data, determine a parameter associated with the object based on the received sensor data and determine a communication interference value associated with the object based on the determined parameter. The electronic processor is also configured to pre-establish communication between the short-range communication device and the mobile communication device in response to determining that the communication interference value exceeds a predefined interference threshold.

20 Claims, 10 Drawing Sheets

(56) References Cited

U.S. PATENT DOCUMENTS

| | | | |
|---|---|---|---|
| 2015/0116103 A1* | 4/2015 | Yang | G08B 1/08 |
| | | | 340/438 |
| 2018/0025635 A1* | 1/2018 | Cheaz | G05D 1/0297 |
| | | | 701/23 |
| 2018/0220429 A1* | 8/2018 | Hazebrouck | H04W 72/542 |
| 2021/0185500 A1* | 6/2021 | Viswanathan | G06F 13/38 |
| 2021/0384993 A1* | 12/2021 | Wu | H04W 72/0453 |
| 2022/0039182 A1* | 2/2022 | Naiki | H04W 76/15 |
| 2022/0264272 A1 | 8/2022 | Linn et al. | |
| 2022/0279324 A1* | 9/2022 | Mourad | H04W 4/80 |
| 2023/0039671 A1* | 2/2023 | Nasu | B60W 50/14 |
| 2023/0168095 A1* | 6/2023 | Lee | G01C 21/3415 |
| 2023/0188930 A1* | 6/2023 | Knott | H04W 4/80 |
| | | | 455/1 |
| 2024/0172309 A1* | 5/2024 | Yeung | H04W 76/18 |
| 2024/0199054 A1* | 6/2024 | Shimamoto | B62D 15/0285 |
| 2024/0354964 A1* | 10/2024 | Yanamala | G06V 10/443 |
| 2024/0416752 A1* | 12/2024 | Peng | H04M 1/724098 |

* cited by examiner

SEAMLESS COMMUNICATION TRANSITIONS FOR SHORT-RANGE NETWORK DEVICES

BACKGROUND OF THE INVENTION

Municipal or other public safety (and, in some cases, private service) personnel rely on communication systems within a vehicle or other mobile system to provide long-range communications back to a central network or central location when the personnel are dispatched. In many instances, personnel also carry one or more short-range communication devices that communicate with long-range devices within their vehicle.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

Figure 1:
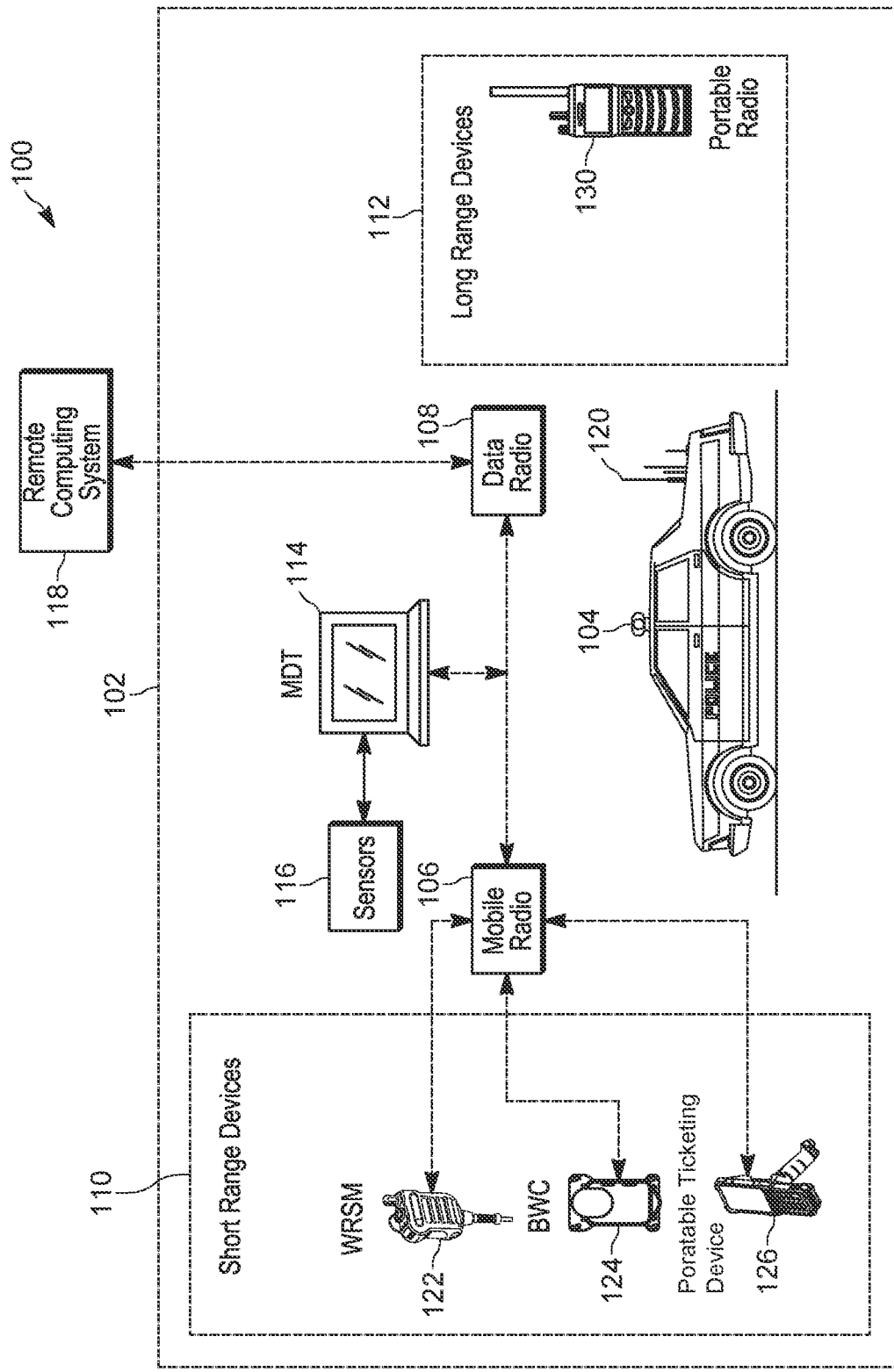
FIG. 1 is a system diagram of a vehicular communication network, according to some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, aspects, and features shown.

The apparatus and method components have been represented where appropriate by conventional symbols in the drawings, showing only those specific details that are pertinent to understanding the embodiments, examples, aspects, and features so as not to obscure the disclosure with details that will be readily apparent to those of ordinary skill in the art having the benefit of the description herein.

SUMMARY

As noted, public safety and other personnel, may carry short range communications devices that communicate with communication devices in a vehicle. However, as the personnel move away from their vehicle, or objects are placed between the personnel and the vehicle, communication between the short-range devices and the longer-range devices in the vehicle may become unreliable. This can result in the user having to switch to a backup long-range communication system which may interrupt communications. In some instances, the personnel may not realize immediately that communication has been interrupted, causing additional delays in reestablishing communication. This hindsight action, typically based on received signal strength indicator ("RSSI") detected by the vehicle communication devices, may cause communication interruption resulting in a poor user experience. The technology described herein leverages connected sensors (visual camera, multi-spectrum, LIDAR, etc.) with recognition over local and cloud databases to identify various characteristics of an object, and its interference over a relatively short-range communication. This foresight analyzes and switches the short-range communication device's backhaul network when the user approaches the above identified object, prior to any RSSI signal degradation. Thus, among other things, example disclosed herein provide uninterrupted connectivity to users.

One example provides a mobile communication system that includes a short-range communication device, a mobile communication device, and a vehicle-based communication device configured to communicate with the short-range communication device. The system also includes a sensor configured to generate sensor data and an electronic processor connected to the sensor. The electronic processor is configured to receive sensor data that is associated with a scene external to a vehicle, detect an object based on the received sensor data, determine a parameter associated with the object based on the received sensor data and determine a communication interference value associated with the object based on the determined parameter. The electronic processor is also configured to pre-establish communication between the short-range communication device and the mobile communication device in response to determining that the communication interference value exceeds a pre-defined interference threshold.

Another example of provides a method for dynamically switching between a vehicle and a personal communication network. The method includes receiving sensor data associated with an object external to the vehicle at a vehicle controller, determining a parameter of the object at the vehicle controller, and determining, at the vehicle controller, a communication interference value associated with the object based on the determined parameter. The method also includes pre-establishing communication between a short-range communication device and a mobile communication device associated with a user in response to determining that the communication interference value exceeds a pre-defined interference level while maintaining communication between the short-range communication device and a vehicle-based long-range communication device.

Another example provides a mobile communication system including a short-range communication device, a mobile communication device, a vehicle-based communication device, and a sensor configured to generate sensor data. The vehicle communication device is configured to communicate with the short-range communication device. The system also includes an electronic processor connected to the sensor that is configured to receive the sensor data associated with a scene external to the vehicle, detect a visual object based on the received sensor data, determine a parameter associated with the visual object based on the received sensor data, determine an external environmental factor, determine a communication interference value associated with the visual object based on the determined parameter and the determine external environment factor. The communication interference value represents a probability of communication between the short-range communication device and the vehicle-based communication device being lost upon the short-range communication device approaching the visual object. The electronic processor is further configured to pre-establish communication between the short-range communication device and the mobile communication devices in response to determining that the communication interference value exceeds a pre-defined interference level.

DETAILED DESCRIPTION

FIG. 1 is a system diagram of a vehicular communication network 100. In the example shown, the vehicular communication network 100 includes a vehicle area network ("VAN") 102 associated with a vehicle 104. The VAN 102 may include vehicle-based communication devices, such as mobile radio 106 and a data radio 108. The VAN 102 may also include a number of portable (i.e., able to be removed from the vehicle) short-range devices 110 and a number of portable long-range communication devices 112, which will be described in more detail below. The VAN 102 may additionally include a mobile computing device 114 ("MDT") in communication with the mobile radio 106 and/or the data radio 108. The VAN 102 also includes a number of sensors 116 for sensing various parameters both inside and outside of the vehicle 104. While shown in FIG. 1 as a car, it is understood that the vehicle 102 is not limited to a car, and may be other vehicle types, such as vans, trucks, motorcycles, armored vehicles, bicycles, scooters, fire trucks, ambulances, helicopters, or other vehicle type appropriate for a given application.

The vehicular communication network 100 may also include a remote computing system 118. In one example, the remote computing system 118 is a cloud-based server. However, various other types of remote computing systems, such as on-premises servers are also contemplated. The remote computing system 118 may be configured to process data provided by the VAN 102, such as data provided by a user into the mobile computing device 114, or data sensed by the sensors 116, as will be described in more detail below. For example, the remote computing system 118 may include an artificial intelligence, machine learning, or other intelligent processing application for interpreting data from the sensors 116.

The mobile radio 106 may be a two-way radio coupled to the vehicle 104. For example, the vehicle 104 may have one or antennas 120 coupled to the mobile radio 106 to facilitate transmission and reception by the mobile radio 106. In some examples, the radio may be a VHF radio, a UHF radio, an HF radio, a land mobile radio ("LMR"), or a combination thereof. The radio may use one or more communication protocols, such as a trunked radio system generally used by municipal organizations (e.g., police, fire, EMS, public safety, federal agencies, public works, etc.). Example trunked radio systems may include SmarTrunk, Ericsson GE, EDACS Provoice, EDACS, GE Mark V. Logic Trunked Radio, LTR Standard, LTR Passport, LTR Standard and Passport, LTR-Net, LTR Multinet, Motorola®, Type I, Type II, Type Ili Hybrid, Type II SmartZone, Type II SmartZone OmniLink, or other trunked radio system as appropriate for a given application. Other communication protocols may include digital mobile radio ("DMR"), OpenSky systems, NEXEDGE® Digital trunked radio Motorola®, Motorola Capacity Plus®, Motorola Connect Plus®, iDEN, NXDN, and/or other communication protocol as required for a given application.

The mobile radio 106 may include other functionality, such as Bluetooth/Bluetooth Low Energy (collectively "Bluetooth") communication and/or Wi-Fi hotspot connectivity. In some examples, the mobile radio 106 may be in communication with the mobile computing device 114. In still other examples, the mobile radio 106 may also be in communication with the data radio 108 to allow for data to be transmitted by, and received from, external devices, such as the remote computing system 118.

The mobile radio 106 is also configured to communicate with one or more portable short-range devices 110. Portable short-range devices 110 may include wireless radio speaker microphones ("WRSM") 122, body worn cameras ("BWC") 124, portable ticketing devices 126, and/or other short-range communication devices (e.g., tasers, smart gun holsters, portable computers, etc.) as required for a given application. The portable short-range devices 110 are configured to communicate with the mobile radio 106 using one or more short-range communication protocols such as Wi-Fi, Bluetooth, or other short-range communication protocol (e.g., LoRA, Z-Wave, Zigbee, Wi-MAX, infrared, low energy ultra-wideband, etc.). The portable short-range devices 110, by the nature of the used short-range communication protocols have a limited communication range. For example, Bluetooth generally has a usable range of approximately 8-10 meters, depending on whether voice or data is being communicated. Similarly, Wi-Fi communications are limited to approximately 50-100 meters. As will be discussed in more detail below, the usable ranges of the portable short-range devices 110 may be affected by external objects, such as obstructions (e.g., other vehicles, buildings, trees, people, etc.), weather conditions, and/or interference from other electronic devices.

The portable long-range devices 112 include devices that may be carried by a user or occupant of the vehicle 102, and which provide for longer range communication than the portable short-range devices 110 described above. Example, portable long-range devices 112 may include personal cellular devices, such as a smartphone (e.g., iPhone®, Android®, or other personal cellular device type) or table computer. The personal cellular device may include one or more applications that allow the cellular device to communicate with one or more devices of the VAN 102, such as the portable short-range devices 110 and/or the mobile computing device 114. The personal cellular device may be configured to communicate using a cellular network (3G, 4G, 5G, LTE, and the like). Other portable long-range devices 112 may include a portable radio 130. The portable radio 130 may be a UHF/VHF radio, a trunked radio, a land mobile radio ("LMR"), a satellite radio or other radio type as required for a given application. In some examples, the portable radio 130 may be configured to communicate with the mobile radio 106 such that the mobile radio 106 acts as a repeater to increase the range of the portable radio 130. In still other examples, the portable radio 130 may be configured to communicate with one or more fixed repeaters associated with a municipal communication network to increase the range of the portable radio 130. In some examples, the portable radio 130 may have an effective communication range of 2 miles. However, ranges of more than 2 miles are also contemplated.

The data radio 108 is configured to communicate with one or more external computing systems, such as the remote computing system 118. The data radio 108 may utilize various communication protocols to communicate data, such as cellular communications (e.g., 3G, 4G, 5G, LTE). The data radio 108 may also include a Wi-Fi (or other data) modem to allow for data to be transmitted or received by the mobile radio 106, the one or more portable short-range devices 110, the portable long-range devices 112, and/or the mobile computing device 114 via Wi-Fi. This can allow for the various above devices to establish communication with external computing systems, such as the remote computing system 118.

The mobile computing device 114 is configured to communicate with the mobile radio 106 and/or the data radio 108. The mobile computing device 114 is also configured to receive various user inputs and allow a user to interface with one or more external computing systems, such as remote computing system 118, via the data radio 108. For example, the mobile computing device 114 may be configured to allow a user to provide information, such as via a keyboard, which may then be transmitted to the remote computing system 118 for processing. For example, the user may input an address, personal information of a citizen, license plate information, patient vital signs, and/or other information as required for a given scenario. The information may then be communicated to the remote computing system 118 for processing. The remote computing system 118 may also transmit data to the mobile computing device 114 via the data radio 108, which may then be provided to the user, such as via a display screen of the mobile computing device 114. As described above, the mobile computing device 114 may also be configured to receive data from one or more portable short-range devices 110, such as the BWC 124 and/or portable ticketing device 126.

The mobile computing device 114 may additionally be configured to receive information from the sensors 116. The sensors 116 may include various sensor types, such as dash cameras, multi-spectrum cameras, RADAR sensors, LIDAR sensor, thermal sensors, license plate readers, infrared sensors, weather sensors, temperature sensors, motion sensors, gunshot microphones, BWCs, 360° cameras, and/or other sensors as required for a given application. The sensors 116 may be configured to provide sensor data with respect to a scene external to the vehicle 102, as well as sensor data with respect to the interior of the vehicle 102, as required for given application. In one example, the mobile computing device 114 is a mobile data terminal.

While shown as separate components, in some examples, one or more of the mobile computing device 114, the mobile radio 106 and/or the data radio 108 may be integrated together. For example, in some examples the mobile radio 106 and the data radio 108 may be combined into a single component. In other examples, the mobile computing device 114 and the data radio 108 may be a single component. In still other examples, the mobile computing device 114, the mobile radio 106, and the data radio 108 are combined into a single component.

Figure 2:
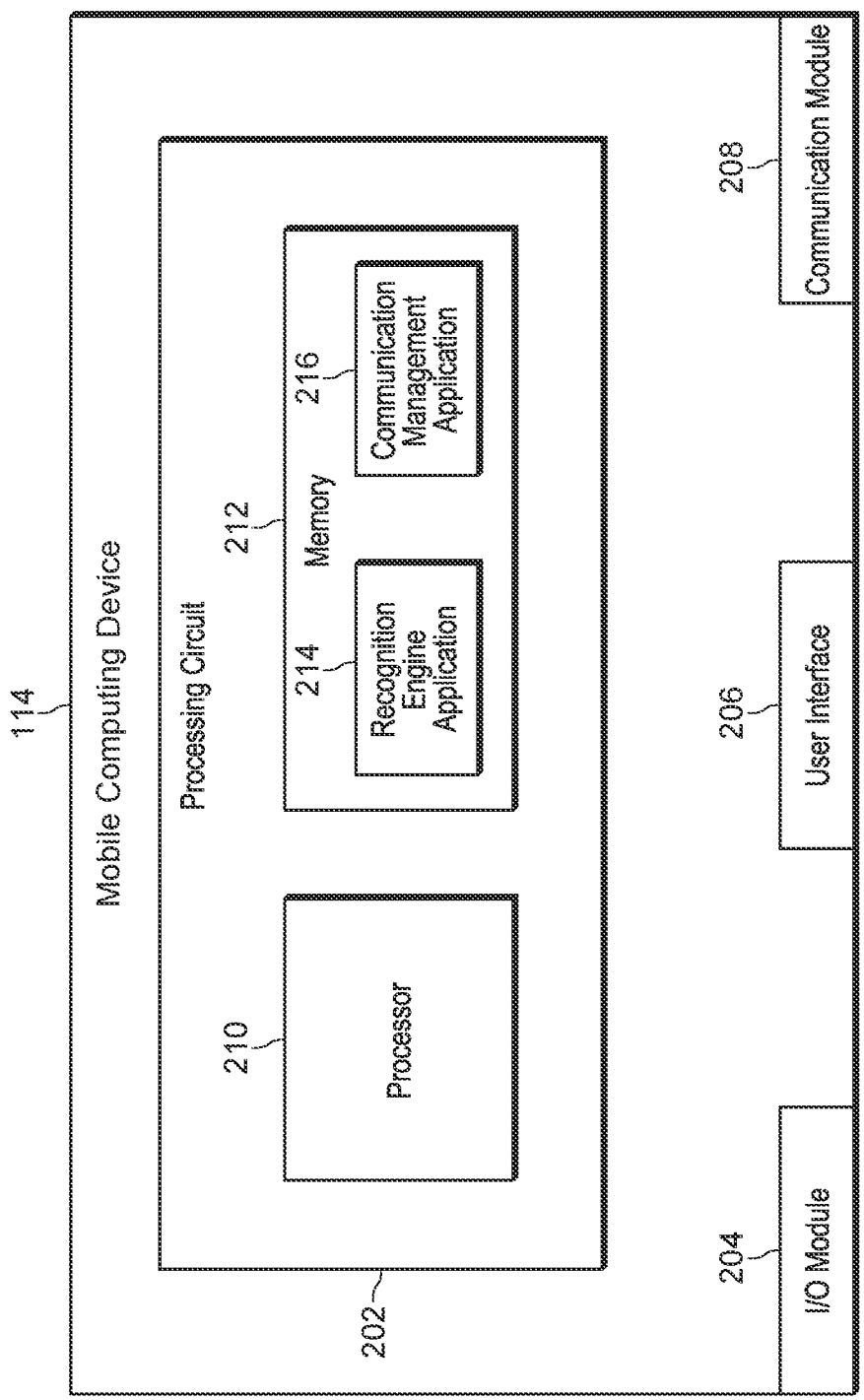
FIG. 2 is a block diagram of a mobile computing device of FIG. 1, according to some examples.

Turning now to FIG. 2, a block diagram of a mobile computing device, such as mobile computing device 114, is described according to some examples. The mobile computing device 114 includes a processing circuit 202, an input-output ("I/O") module 204, a user interface 206, and a communication module 208. The processing circuit 202 may include a processor 210 and a memory 212.

The processing circuit 202 may be communicably connected to one or more of the I/O module 204, the user interface 206, and the communication module 208. The electronic processor 210 may be implemented as a programmable microprocessor, an application specific integrated circuit (ASIC), one or more field programmable gate arrays (FPGA), a group of processing components, or other suitable electronic processing components.

The memory 212 (for example, a non-transitory, computer-readable medium) includes one or more devices (for example, RAM, ROM, flash memory, hard disk storage, etc.) for storing data and/or computer code for completing or facilitating the various processes, layers, and modules described herein. The memory 212 may include database components, object code components, script components, or other types of code and information for supporting the various activities and information structure described in the present application. According to one example, the memory 212 is communicably connected to the electronic processor 210 via the processing circuit 202 and may include computer code for executing (for example, by the processing circuit 202 and/or the electronic processor 210) one or more processes described herein.

In one example, the memory 212 may store one or more applications, programs, etc., such as a recognition engine application 214 and/or a communication management application 216. The recognition engine application 214 may be configured to determine one or more parameters or features of an object detected by the sensors 116. For example, the recognition engine application 214 may utilize data received from the sensors 116 to determine an object type, a material of the object, a location of the object, a distance to the object, or other parameters as required for a given application. In some examples, the recognition engine application 214 may utilize computing resources from the remote computing system 118 or may be generally hosted on the remote computing system 118. Functions and operations of the recognition engine application 214 will be described in more detail below.

As will be described in more detail below, the communication management application 216 may be configured to control communication between the various communication devices described above. For example, the communication management application 216 may be configured to control the portable short-range devices 110 to communicate with either the mobile radio 106 or one of the portable long-range devices 112, based on one or more factors, such as those provided by the recognition engine application 214.

The I/O module 204 may be configured to interface directly with one or more devices, such as the sensors 116. In one example, the I/O module 204 may utilize general purpose I/O (GPIO) ports, analog inputs, digital inputs, etc. to interface with the one or more devices. The I/O module 204 may also communicate with devices such as the mobile radio 106 and/or the data radio 108.

The user interface 206 may include an input device to allow a user to provide input to the mobile computing device 114. Example input devices may include a keyboard, a mouse, a touchscreen (capacitive, resistive, infrared, etc.), or other applicable input device. The user interface 206 may also provide a display to allow the user to receive data from the mobile computing device 114.

The communication module 208, which includes, for example, one or more transceivers, may be configured to provide wireless communications between the mobile computing device 114 and one or more other devices, such as the mobile radio 106, the data radio 108, and/or one or more portable long-range devices 112. For example, the communication module 208 may communicate with devices, such as the mobile radio 106, the data radio 108, one or more portable short-range devices 110, and/or portable long-range devices 112 using Wi-Fi. However, in other examples, the communication module 208 may use one or more wireless communication protocols to provide communication to/from the external devices. For example, wireless communication protocols, such as Bluetooth, Cellular (e.g., 3G, 4G, 5G, LTE, CDMA, TDMA, etc.), RF, Wi-Fi, LoRa, LoRaWAN, Z-wave, Thread, Matter, and/or any other applicable wireless communication protocol may be used to facilitate communication between the mobile computing device 114 and various other external devices.

Figure 3:
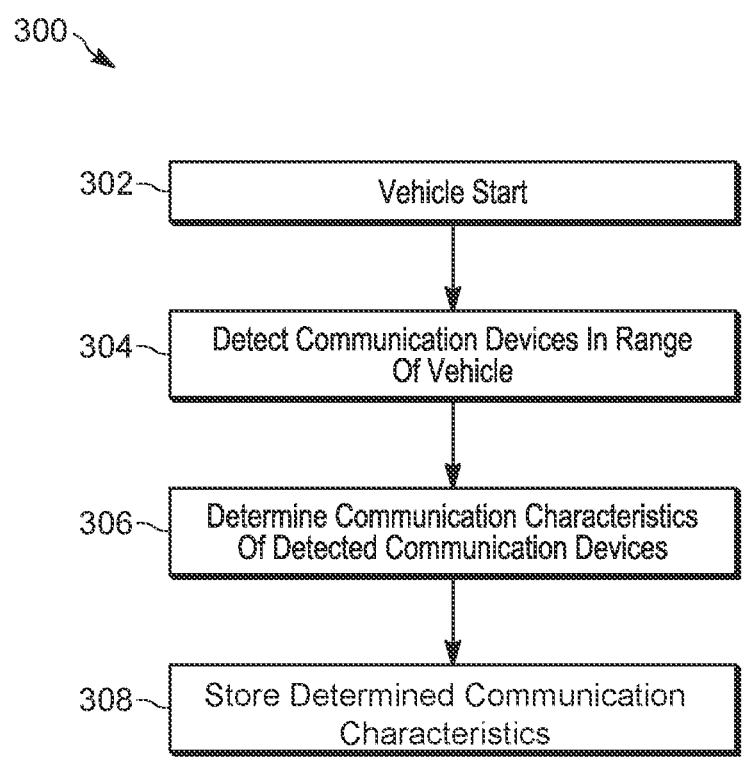
FIG. 3 is a flow chart illustrating a process for initializing communication devices within a vehicle area network, according to some examples.

Turning now to FIG. 3, a process 300 for initializing communication devices within a VAN, such as VAN 102, is shown according to some examples. At process block 302, the VAN 102 is initialized. In some examples, the VAN 102 may be initialized when an engine or other prime mover of a vehicle associated with the VAN 102 is started/engaged. In other examples, the VAN 102 may be initialized by a user or occupant of the vehicle initiating an initialization process. For example, the user may switch on the mobile computing device 114 to initiate the initialization process. In other examples, the VAN 102 may be initialized in response to a user providing login information to the mobile computing device 114.

At process block 304, the mobile computing device 114 detects all communication devices within a communication range of the vehicle. In some examples, the mobile computing device 114 may only search for communication devices that have previously been associated/linked with the VAN 102. Communication devices may include portable short-range devices 110, portable long-range devices 112, data radio 108, mobile radio 106, and/or other communication devices associated with a VAN 102 as required for a given application. Upon detecting all communication devices in range of the vehicle, the mobile computing device 114 determines communication characteristics of all detected communication devices at process block 306. Communication characteristics may include a communication protocol type (e.g., Bluetooth, Wi-Fi, RF (VHF/UHF/HF), cellular (3G, 4G, 5G, LTE)), a communication range, a transmit power level, and/or any other parameter associated with a communication capability of the device. At process block 308, the determined communication characteristics are stored in a memory of the mobile communication device 114, such as memory 212.

Figure 4:
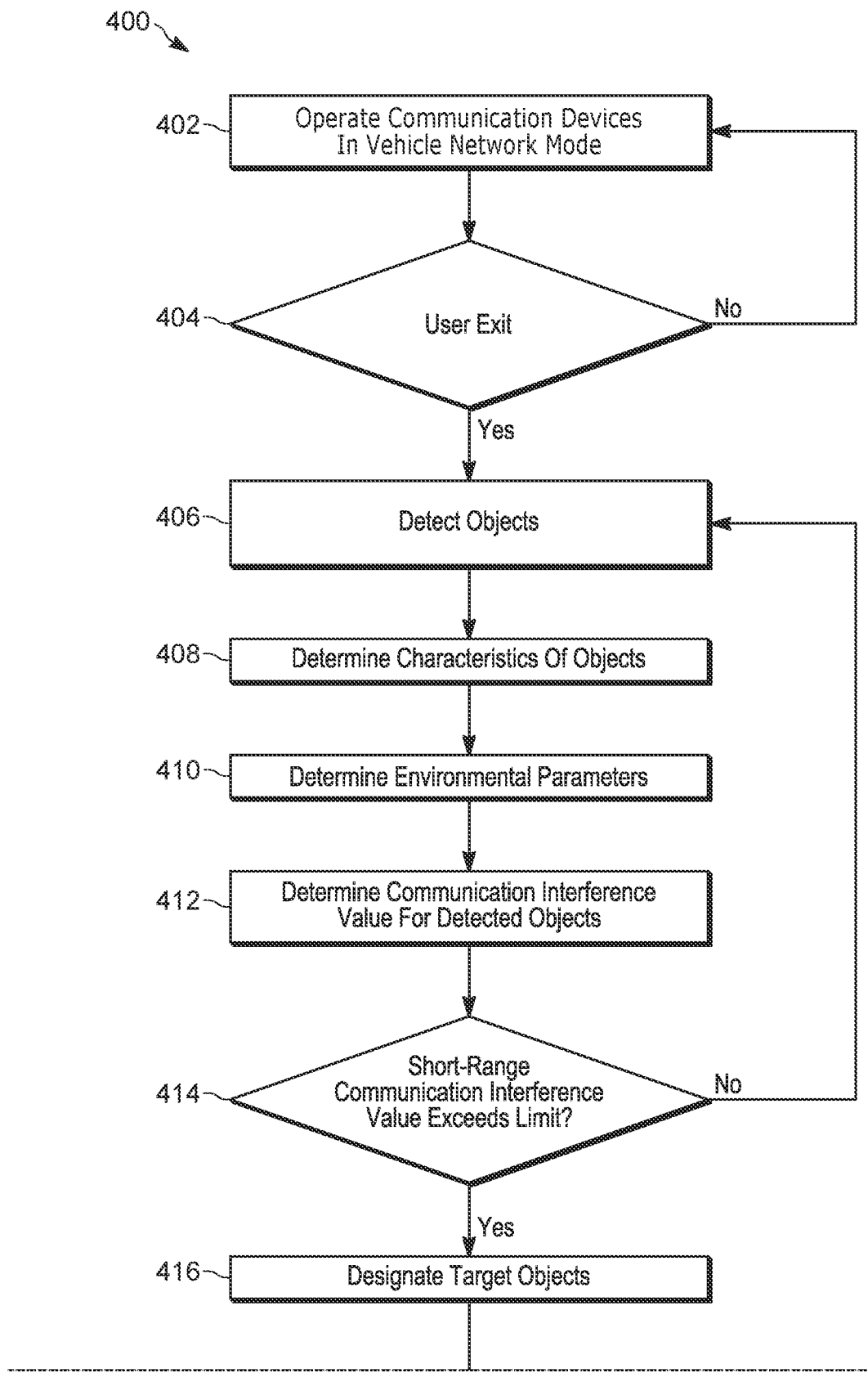
FIG. 4 is a flow chart illustrating a process for dynamically controlling communication paths of portable short-range communication devices, according to some examples.
Figure 4:
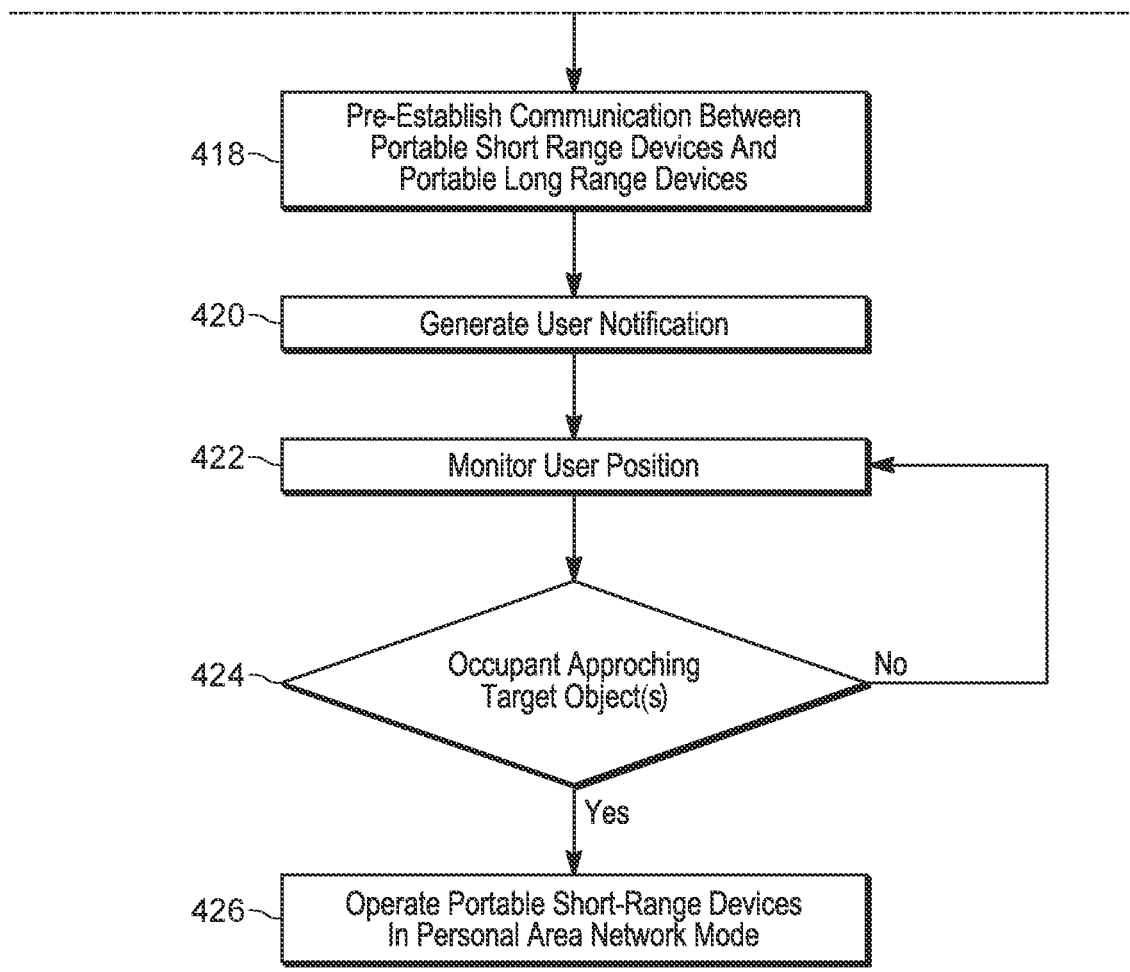

Turning now to FIG. 4, a process 400 for dynamically switching short-range communication devices from a VAN to a personal area network ("PAN") is described, according to some examples. A PAN consists of one or more long-range communication devices (such as portable long-range devices 112) that are associated with a user or occupant of a vehicle and that are not reliant on communication devices with a VAN, such as VAN 102, for long-range communication. For purposes of this application, long-range communication may be understood as communication with communication networks, remote communication devices, remote computing systems (such as remote computing system 118), municipal or governmental communication systems, and/or any other communication device outside of the VAN 102. Long-range communication may also include any communication device or type capable of transmitting and receiving data over a distance of at least 100 meters. However, distances of more than 100 and less than 100 meters are also contemplated. In one example, the process 400 is performed by a combination of the recognition engine application 214 and the communication management application 216. Additionally, the remote computing system 118 may also perform portions of the process 400 and/or provide additional resources to the mobile computing device 114 to perform the process 400.

At process block 402, all portable communication devices associated with a VAN are operated in a vehicle network mode. The portable communication devices may be any portable communication devices detected in process 300 and may include portable short-range devices 110 and portable long-range devices 112, as described above. When operating in a vehicle network mode, the portable short-range devices 110 are configured to communicate with one or more devices within the VAN 102, such as the mobile radio 106 and data radio 108. Generally, no communication between portable short-range devices 110 and portable long-range devices 112 is present when the portable communication devices are operating in the vehicle network mode. Rather, the portable short-range devices 110 communicate with the mobile radio 106, as described above. Additionally, when in the vehicle network mode, the portable long-range devices 112 may be configured to operate as normal, but are not coupled to, or in communication with any of the portable short-range devices 110.

At process block 404, the mobile computing device 114 determines whether an occupant of the vehicle exits or otherwise attempts to move away from the vehicle. In some examples, the mobile computing device 114 determines that the occupant of the vehicle is exiting or moving away from the vehicle based on data provided by sensors, such as sensors 116. For example, sensors such as internal cameras, weight sensors, motion sensors, door sensors, or the like may be used to determine that an occupant of the vehicle is exiting or preparing to exit the vehicle. In some examples, the mobile computing device 114 may determine that the occupant is preparing to exit in response to the vehicle being placed in "park." However, it is understood that various sensed parameters may be used to determine that an occupant is, or is preparing to, exit the vehicle. In response to the occupant being determined to not be exiting the vehicle, the mobile computing device 114 continues operating the portable communication devices in the vehicle network mode at process block 402.

In response to determining that the occupant is exiting the vehicle, the mobile computing device 114 detects one or more objects external to the vehicle at process block 406. The mobile computing device 114 may detect the one or more objects based on sensor data provided by the sensors 116. For example, sensors 116 such as dash cameras, RADAR, LIDAR, and the like may be used to detect the one or more object. The objects may include other vehicles (e.g., trucks, cars, tractor-trailers, motorcycles, recreational vehicles, busses, construction equipment), buildings, obstacles (hills, jersey barriers, pilings, bridge abutments, trees, rocks, plants, etc.), or other objects. In some examples, the recognition engine application 214 of the mobile computing device 114 detects the objects. In other examples, the mobile computing device 114 may detect the objects with help from one or more applications on the remote computing system 118. For example, the mobile computing device 114 may transmit some or all of the sensor data to the remote computing system 118 for processing. In other examples, a combination of the mobile computing device 114 and the remote computing system 118 work in conjunction to detect the objects external to the vehicle.

Upon detecting the objects external to the vehicle, the mobile computing device 114 determines one or more characteristics of the detected objects at process block 408. Characteristics may include a distance to the object, a position of the object, a type of object (e.g., vehicle, building, obstacle, person), a material of the object, or other characteristic as required for a given application. The mobile computing device 114 may determine the characteristics of the detected items based on data from the sensors 116. For example, distance of the objects from the vehicle may be determined using RADAR, LIDAR, or camera-based sensors. Material types of the objects may be determined using sensors such as a multi-spectrum camera. In some instances, inferences of characteristics may be determined based on identifying data. For example, where the objects are people, a characteristic may include a likelihood that they carry one or more electronic devices. Other examples may include accessing a database associated with a detected object to infer details, such as a material of an object. For instance, where a license plate reader sensor provides license plate information, the mobile computing device 114 may access a database, such as a database on the remote computing system 118 that contains information about the vehicle associated with the license plate number, which may include material information (e.g., steel framed vehicle vs. a modern plastic and aluminum-based vehicle).

In still other examples, an address of a building (object) may be known, and one or more databases may be accessed, such as databases accessible by the remote computing system 118. The database may include information about a building, such as material, size, layout, major facilities, or machinery, etc. which may then be provided to the mobile computing device 114. The above examples are not to be considered limiting, and it is understood that various other sensors, databases, and/or processes may be used to determine various characteristics of the detected objects. Additionally, while the mobile computing device 114 is described as determining the characteristics of the detected objects, it is understood that the remote computing system 118, either alone or in combination with the mobile computing device 114, and/or other external computing systems may all be utilized to determine the characteristics of the detected objects.

Upon determining the characteristics of the detected objects, environmental characteristics external to the vehicle may be determined at process block 410. Environmental characteristics may include precipitation (e.g., rain, snow, sleet, hail, smoke/soot), temperature, humidity, cloud cover, wind, and/or other applicable weather characteristic. In one example, the mobile computing device 114 may use sensor data provided by the sensors 116 to determine the environmental characteristics external to the vehicle. For example, the camera-based sensors may be able to detect precipitation, cloud cover, wind, or other visible environmental characteristics. Additional sensors 116, such as wind sensors, temperature sensors, humidity sensors, or other environmental sensors may be able to provide data to the mobile computing device 114 to determine additional environmental characteristics. In other examples, the mobile computing device 114 may receive data from one or more external systems, such as the remote computing system 118 or other services which can provide an indication of weather or other environmental conditions associated with a location of the vehicle.

The mobile computing device 114 then determines a communication interference value for the detected objects at process block 412. The communication interference value is a value representing a likelihood or probability of communication between one or more portable short-range devices 110 and the associated communication device within the VAN 102, such as the mobile radio 106 and/or data radio 108, being interrupted as an occupant (and therefore the associated portable short-range device 110) approaches or is in proximity to the object. The communication interference value may be based on the determined object characteristics, the determined environmental characteristics, as well as the determined communication characteristics associated with the individual portable short-range devices 110. Generally, a higher communication interference value indicates a higher likelihood of the detected object causing an interruption between the portable short-range devices 110 and the VAN 102 communication devices. For brevity, VAN 102 communication devices are understood to be any non-portable communication device within the VAN 102.

For example, the mobile computing device 114 may determine the communication interference value for a detected object based on factors such as size, distance from the vehicle, and/or material of the detected object. Larger objects may have a higher communication interference value than smaller objects due to the potential to block a line of sight between a portable short-range communication device and the vehicle. Additionally, material types may impact the communication interference value. For example, a steel trailer on a semi-truck may result in a higher communication interference value than a trailer made of wood or plastic due to the steel being more likely to interrupt communications, especially where the trailer is between the portable short-range device 110 and the VAN 102 communication devices. Additionally, distance to a detected object may affect the communication interference value. Specifically, as the distance to an object increases, so does the communication interference value, as the communication range of the portable short-range devices 110 is limited, as described above. Other characteristics of the detected objects may also be used, and it is understood that one or multiple characteristics may be used to generate the communication interference value.

In other examples, the characteristics of the portable short-range devices 110 are used in the determination of the communication interference value. The characteristics of the portable short-range devices 110 may be used in conjunction with the detected object characteristics to determine the communication interference value. For example, the communication protocol (Bluetooth, Wi-Fi) may be used to determine the communication interference value for a given detected object. The type of communication protocol provides data as to communication distances, as well as possible conditions that may adversely impact the communication distance. For example, rain and humidity may impact Bluetooth communications more than Wi-Fi, while metallic structure may impact Wi-Fi communications more than Bluetooth. Additionally, characteristics such as transmitter power, antenna type, battery level, etc. may be used in the determination of the communication interference value.

The mobile computing device 114 may also evaluate environmental characteristics to determine the communication interference value. The environmental characteristics may be used in combination with the object characteristics and/or the portable short-range device characteristics to generate the communication interference value for a given object. For example, heavy precipitation (e.g., density of precipitation) may adversely impact short-range communication by the portable short-range devices 110. Cloud cover, humidity, and wind may also impact the communication reliability of the portable short-range devices 110. For example, heavy precipitation may impact higher frequency communications, such as those in the VHF/UHF range, or higher ranges such as those used in open industrial, scientific and medical (ISM) radio frequency bands in ~10 GHz range (Bluetooth, ZigBee, Wi-Fi, etc.), by absorbing parts of the wireless signal. Humidity and/or heavy cloud cover may similarly partially absorb the wireless signal resulting in a degradation of signal. Additionally, many times portable devices utilize low power transmitters (e.g., milliwatt range) to improve battery life, which results in the transmitted signals being more likely to be adversely affected by precipitation.

In some examples, the communication interference value may be a numerical value, such as 1 to 5. Where 1 indicates a low likelihood of communication interruption and 5 indicates a high likelihood of communication interruption. However, other numerical scales may also be used. In other examples, the communication interference value may be a rating, such as high, intermediate, and low. In some examples, the mobile computing device 114 (and/or the remote computing system 118) may use one or more artificial intelligence or machine learning processes to generate the communication interference values. However, other computing processes may also be used to determine the communication interference values.

The communication interference value may be based on a combination of objects between the portable short-range devices 110 and a VAN, such as VAN 102, as each object may be able to attenuate, reflect, absorb, scatter, refract, diffract, or otherwise adversely affect communications between the portable short-range devices 110 and the VAN 102. The more an object is determined to present a risk of adversely affecting communication between the portable short-range devices 110 and the VAN 102 results in a higher communication interference value for each object being determined. The communication interference value for each object positioned between the vehicle and a portable short-range device 110 (or expected location) may be summed to generate the total communication interface value. In other examples, the communication interference value may be an average, median, or mode of the communication interference values of the objects positioned between the vehicle and the portable short-range devices 110.

Upon determining the communication interference value, the mobile computing device 114 determines whether any detected object has an associated communication interference value that exceeds a predetermined value at process block 414. In some examples, the predetermined value may be based on an acceptable interference level provided by an occupant of the vehicle, or a municipality associated with the vehicle. For example, where the communication interference value is a numerical value from 1 to 5, the predetermined value may be 3, such that any communication interference value of 3 or more would exceed the predetermined value. In response to determining that none of the detected objects have an associated communication interference value that exceeds the predetermined limit, the mobile computing device 114 continues to detect objects at process block 406.

In response to determining that one or more of the detected objects have a communication interference value that exceed the predetermined value, the mobile computing devices 114 designates each object with a communication interference value that exceeds predetermined value as a target object at process 416.

At process block 418, the mobile computing device 114 pre-establishes communication between a portable short-range device 110 and a portable long-range device 112. Pre-establishing communication between a portable short-range device 110 and a portable long-range device 112 may include the mobile computing device 114 transmitting an identifier of the portable short-range device 110 to one or more portable long-range devices 112. The identifier may include a device universally unique identifier (UUID), such as a MAC address, of the portable short-range device 110. This can allow for a portable long-range device 112 to quickly establish a communication link with a portable short-range device 110 upon receiving an instruction to do so from the mobile computing device 114. The pre-establishment of communication may allow for a portable long-range device 112 to have an initial level of access control of the respective portable short-range device 110, such as authentication, authorization, adding to a pre-established pairing list, security management links, or other initial access control that would facilitate a connection being established efficiently between the portable long-range device 112 and the portable short-range device 110. In some embodiments, access control may be provided as information to the portable long-range devices 112.

By pre-establishing communication between a portable short-range device 110 and a portable long-range device 112, when a user is subsequently determined to be approaching an object which may adversely affect communication between the portable short-range device 110 and the VAN 102 devices, a latency associated with switching communications to the portable long-range devices is reduced such that any pause in communication capabilities is reduced and, in some cases, eliminated. For example, latency may be reduced by 75%. However, values of more than 75% or less than 75% are also contemplated.

Upon pre-establishing communication between the portable short-range devices 110 and the portable long-range devices 112, a user notification is generated at process block 420. The user notification may include an instruction to a user, such as an occupant of the vehicle, to take the one or more portable long-range devices 112 with them upon exiting the vehicle. The generated user notification may be provided to the user via the user interface 206 of the mobile computing device 114. In other examples, the generated user notification may be an audio alert provided to the user, such as via the car audio system or a portable short-range device 110. Other user interface devices may also be utilized to provide the generated user notification to the user.

The mobile computing device 114 then monitors a position of a user associated with the vehicle 102 upon exiting the vehicle 102 at process block 422. The position of the user may be monitored using the sensors 116. The mobile computing device 114 then determines whether the user is approaching one of the designated target objects at process block 424. The user may be determined to be approaching a designated target object based on their distance to the designated target object falling below a threshold value. For example, the threshold value may be 3 meters. However, values of more than 3 meters or less than 3 meters are also contemplated. Other parameters, such as rate of travel, rate of change of distance to the designated target object, etc. may be used to determine whether the user is approaching the target object. In response to determining that the user is not approaching the target object, the mobile computing device 114 continues to monitor the position of the user at process bock 422.

In response to determining that the user is approaching a designated target object, the portable short-range devices 110 are switched to operate in a PAN mode and communication is established between the portable short-range devices 110 and one or more portable long-range devices 112, such as a cellular device or portable radio 130 at process block 426. This can allow for the portable short-range devices 110 to maintain communication with the desired network even if communication with the VAN 102 is lost. In some examples, the mobile computing device 114 may transmit an instruction to the portable long-range devices 112 to establish communication with one or more of the portable short-range devices 110. As the portable long-range devices 112 have already received information, such as the UUID of the portable short-range devices 110, the portable long-range devices 112 can quickly establish communication with the portable short-range devices 110 upon receiving the instruction from the mobile computing device 114. Further, due to the information received during the pre-establishment, functions such as encryption, authentication, authorization (e.g., security access control, or other action as required for a given application may be reduced in the event that the portable short-range devices 110 are configured to communicate with the portable long-range devices 112 as described below.

By pre-emptively switching the communication connection of the portable short-range devices 110 to the portable long-range devices 112 in response to determining that a user is approaching an object that may adversely affect communication, the risk of communication being lost or degraded for the portable short-range devices 110. For example, instead of switching the short-range devices 110 to operate in a PAN mode in response to degradation of communication with the VAN 102 devices being detected, the short-range devices 110 are controlled to operate in the PAN mode prior to any actual degradation occurring by controlling the switching to the PAN network based on a likelihood or probability that communication may be degraded due to one or more objects, as described above. Further, as noted above, due to the pre-establishment of communication between the portable short-range devices 110 and the portable long-range devices 112, this switching to the PAN mode may occur without any noticeable effect to a user.

Figure 5:
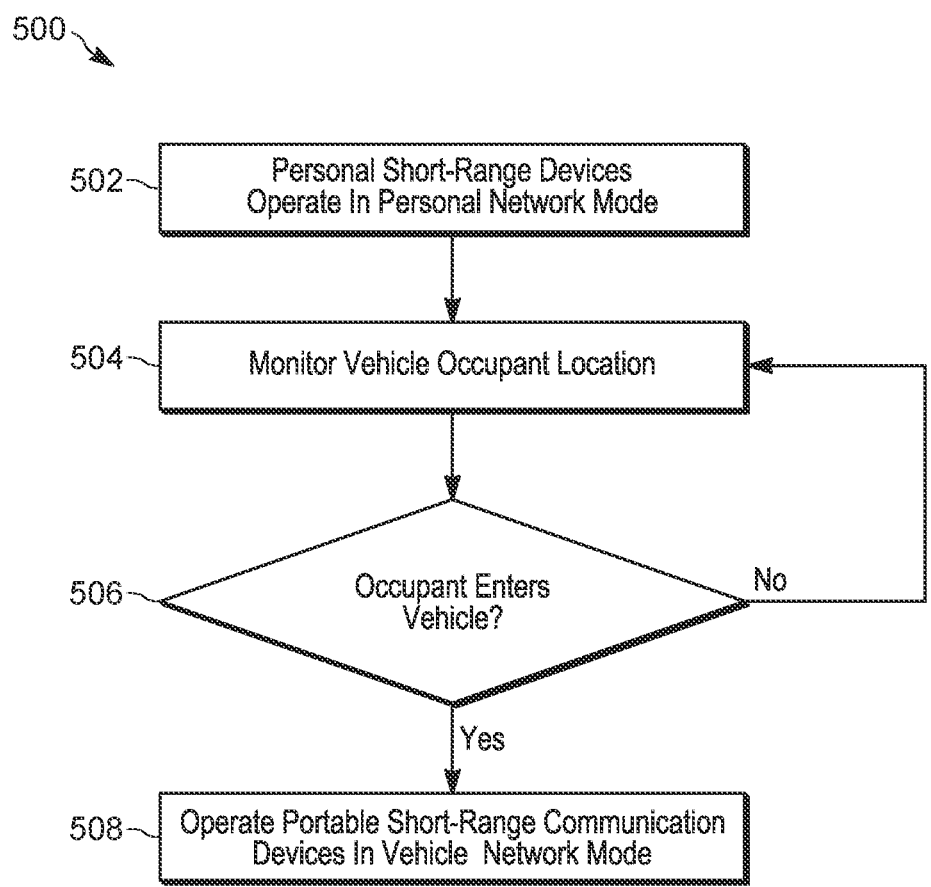
FIG. 5 is a flow chart illustrating a process for reestablishing communication between one or more portable short-range devices and a vehicle area network, according to some examples.

Turning now to FIG. 5, a process 500 for reestablishing communication between one or more portable short-range devices 110 and the VAN 102 is described, according to some examples. At process block 502, one or more portable short-range devices 110 are operating in a PAN mode. At process block 504, the mobile computing device 114 monitors the location of a user associated with the one or more portable short-range devices 110. For example, the location of the user may be monitored using the sensors 116 in combination with the mobile computing device 114.

At process block 506, the mobile computing device 114 determines whether the user has entered the vehicle 102. The mobile computing device 114 may determine that the user has entered the vehicle based on data provided by the sensors 116, such as door sensors, camera sensors, occupancy sensors, or other sensor as required for the application. In response to determining that the user has not entered the vehicle, the mobile computing device 114 continues to monitor the user location at process block 504.

In response to determining that the user has reentered the vehicle 102, any portable short-range device 110 associated with the user that is in communication with the PAN is switched to communicate with the VAN 102 at process block 508. For example, the mobile computing device 114 may instruct the VAN 102 devices, such as the mobile radio 106, to establish communication with the portable short-range devices 110 associated with the user.

Figure 6:
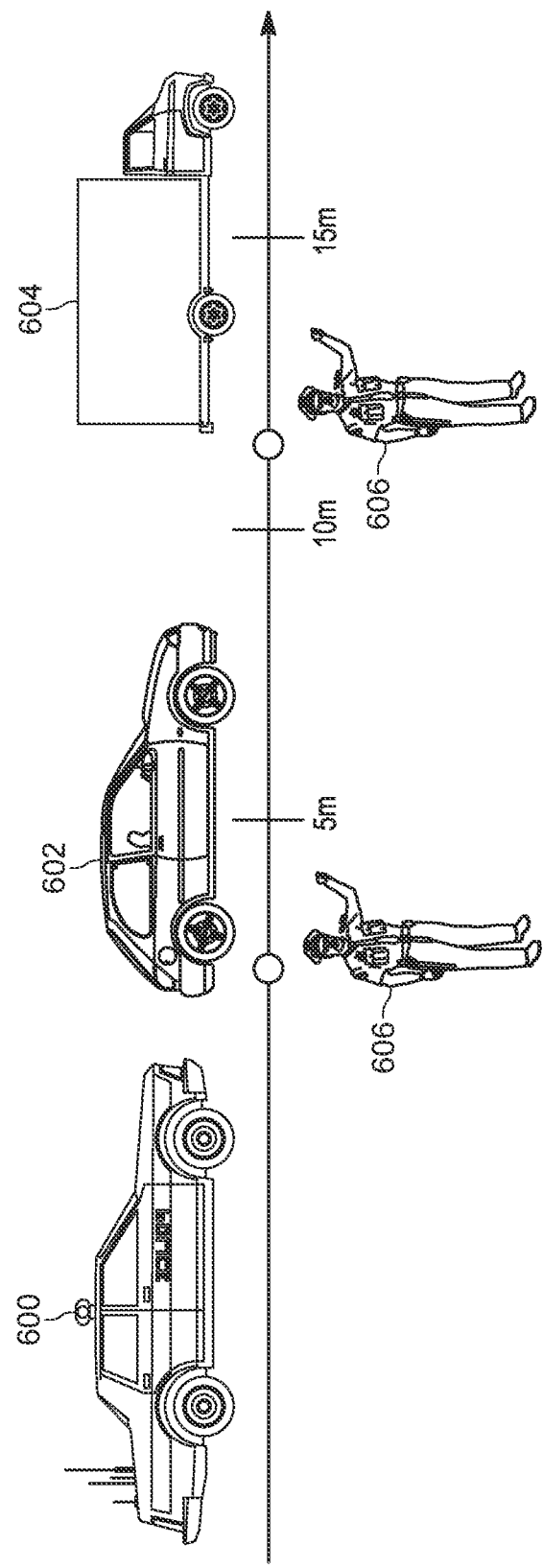
FIG. 6 illustrates an example scenario utilizing the process of FIG. 4, according to some examples.

Turning now to FIG. 6, an example scenario for utilizing the process 400 described above is shown, according to some examples. A vehicle 600 is shown at a scene with a car 602 and a truck 604. The vehicle 600 is shown as a police car, and the scenario may be a traffic stop or accident to which a police officer 606 has responded. As described with respect to the process 400 above, the car 602 and the truck 604 may be identified as objects, and a communication interference score may be determined with respect to both. In one example, the car 602 may receive a communication interference value of 2, and the truck 604 may receive a communication interference value of 4. The truck 604 may receive a higher communication interference score than the car 602 due to the size, material, and distance from the vehicle 600 of the truck 604. In this example, the communication interference value threshold is 3. Thus, communication between a portable short-range device 110 of the officer 606 and a portable long-range device 112 of the officer 606 is preestablished, as described above, in response to one of the detected objects (truck 604) having a communication interference value that exceeds the communication interference value threshold. As the police officer 606 is determined to approach the car 602, no action is taken as the car 602 does not have a communication interference value that exceeds the communication interference value threshold. However, as the officer nears the truck 604, communication is established between the portable short-range devices 110 and the portable long-range devices 112 to reduce the chance of communication interruption between the portable short-range devices 110 and VAN devices of the vehicle 600.

Figure 7:
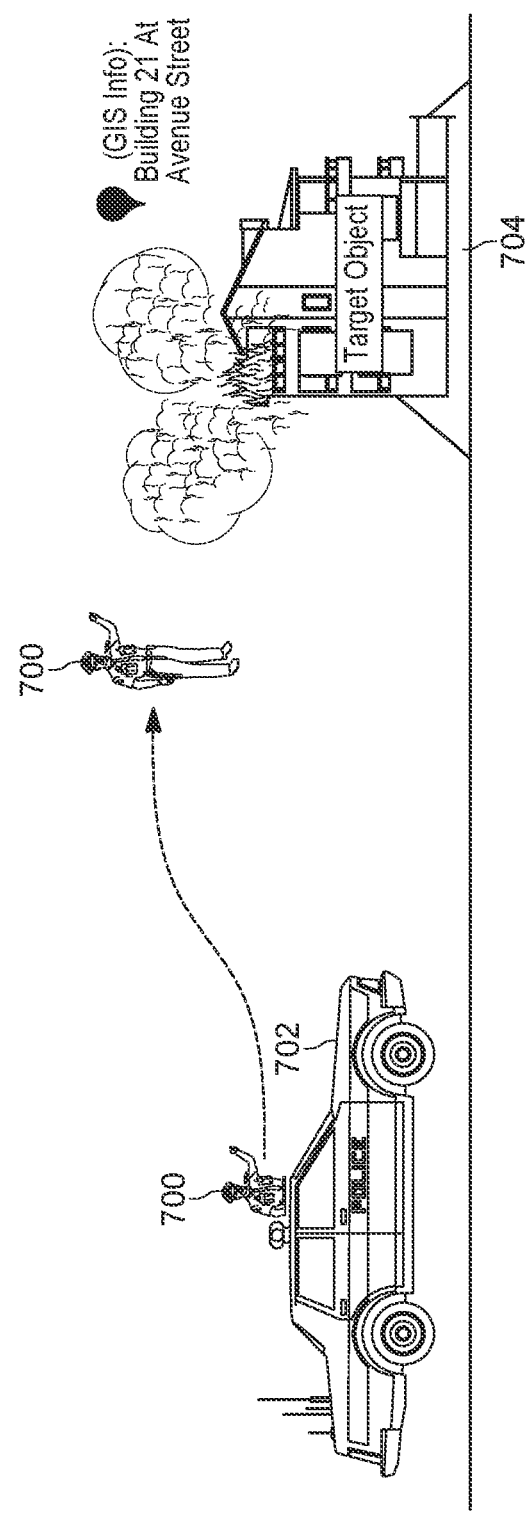
FIG. 7 illustrates an additional example scenario utilizing the process of FIG. 4, according to some examples.

Turning now to FIG. 7, an additional example scenario for utilizing the process 400 described above is shown. Here, an officer 700 in a vehicle 702 is at a building 704 fire. While shown as a police officer, it is understood that the officer 700 may be any sort of emergency response worker, such as a firefighter, a paramedic, etc. Using the process 400, the building 704 is detected as an object. Characteristics of the building 704 may be determined based on sensor data provided by one or more sensors of the vehicle 702, such as those described above. Additional information about the building 704 may be provided by a database or other computing systems, such as the remote computing system 118 described above. The additional information may include building material type, a building layout, etc. Based on the determined characteristics, the communication interference value is determined for the building. Where the communication interference value exceeds threshold, communication is preestablished between portable short-range devices 110 of the officer 700 and the portable long-range devices 112 of the officer 700, as described above. As the officer 700 approaches the building, the portable long-range devices 112 may be instructed to establish communication with the portable short-range devices 110 of the officer 700. In some examples, the officer 700 may be determined to be approaching the building 704 upon entering the building.

Figure 8:
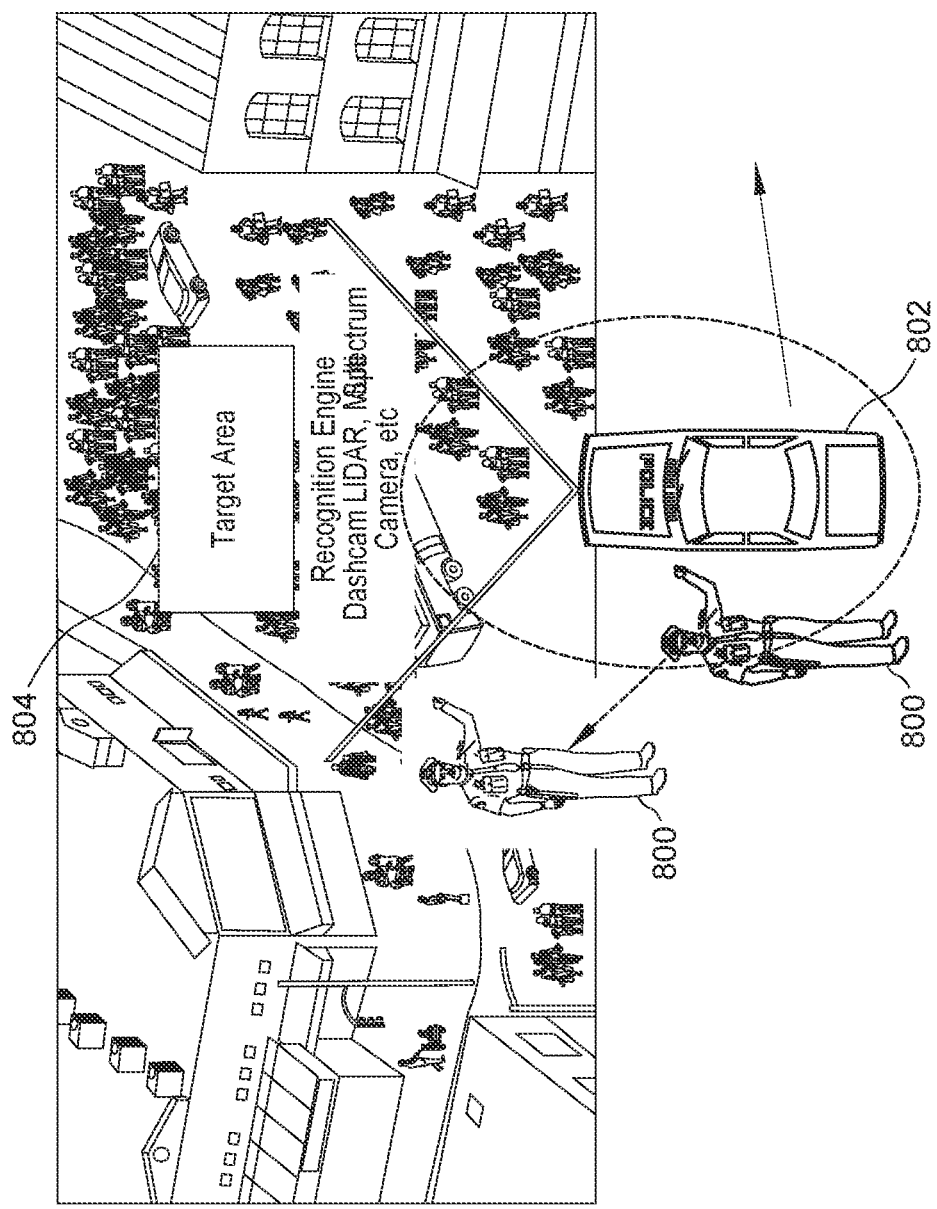
FIG. 8 illustrates an additional example scenario utilizing the process of FIG. 4, according to some examples.

Turning now to FIG. 8, an additional example scenario for utilizing the process 400 described above is shown. In this scenario, an officer 800 is working crowd control. A mobile computing device 114 of the vehicle 802 may detect multiple objects, which may be people in the crowd, as well as cars, trees, buildings, etc. As shown in FIG. 8, a target area 804 of the crowd may be detected as a single object, such as where the crowd density would qualify as an object. In other examples, multiple target area may be detected with varying communication interference values. With respect to the target areas, the communication interference score may be based on the crowd density, which may be an indication of not only physical interference with communications (e.g., bodies, clothes, etc.), but also an indication of a quantity of other electronic devices, such as cellular phones or other portable Internet of Things ("IoT") devices, such as drone remote controls, Wi-Fi car cameras, security or live streaming cameras, and/or other devices which may increase the communication interference value. For examples, one or more other electronic devices may use a frequency similar to that used by the portable short-range communication devices 110 which may adversely affect the communication range or quality of said devices. In the event that the communication interference value of a target area, such as target area 804 exceeds the communication interference value threshold, communication is preestablished between portable short-range devices 110 of the officer 800 and the portable long-range devices 112 of the officer 800, as described above. As the officer 800 approaches the target area 804, the portable long-range devices 112 may be instructed to establish communication with the portable short-range devices 110 of the officer 800.

Figure 9:
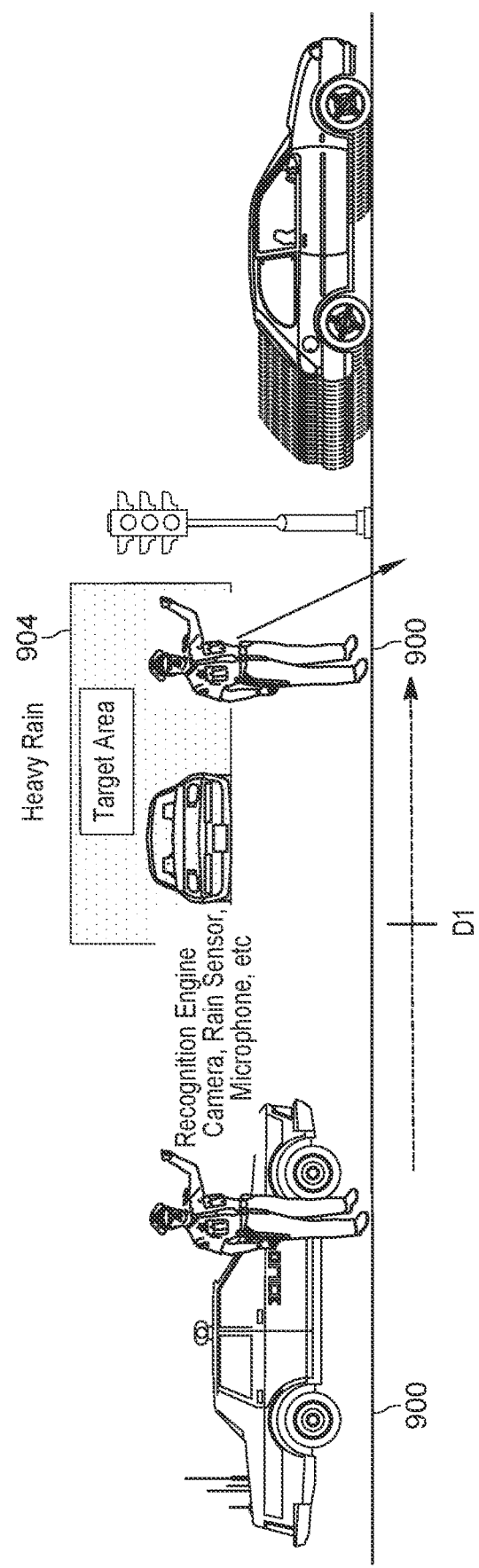
FIG. 9 illustrates an additional example scenario utilizing the process of FIG. 4, according to some examples.

Turning now to FIG. 9, an additional example scenario for utilizing the process 400 described above is shown. In this scenario, an officer 900 is working traffic control. In this instance, the officer 900 may be working at a distance D1 from their vehicle 902. Heavy rain may be detected by the sensors of the vehicle 900. The presence of rain, in combination with characteristics of the portable short-range devices 110 of the officer 900 may result in the mobile computing device 114 designating a "target area" 904 associated with a distance away from the vehicle 902 as an object. The target area 904 may be a distance from the vehicle 902 at which point a communication interference value based on the environmental conditions and portable short-range device 110 characteristics exceeds the communication interference value threshold. Thus, communication is preestablished between portable short-range devices 110 of the officer 900 and the portable long-range devices 112 of the officer 900, as described above. As the officer 900 approaches the target area 904, the portable long-range devices 112 may be instructed to establish communication with the portable short-range devices 110 of the officer 900.

In the foregoing specification, specific embodiments, examples, aspects, and features have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claimed subject matter require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

We claim:

1. A mobile communication system, comprising:
   a short-range communication device;
   a mobile communication device;
   a vehicle-based communication device, wherein the vehicle-based communication device is configured to communicate with the short-range communication device;
   a sensor configured to generate sensor data; and
   an electronic processor connected to the sensor and configured to:
   receive the sensor data, wherein the sensor data is associated with a scene external to a vehicle;
   detect an object based on the received sensor data;
   determine a parameter associated with the object based on the received sensor data;
   determine a communication interference value associated with the object based on the determined parameter; and
   pre-establish communication between the short-range communication device and the mobile communication device in response to determining that the communication interference value exceeds a pre-defined interference threshold.

2. The system of claim 1, wherein the controller is further configured to:
   detect an occupant of the vehicle approaching the object determined to have a communication interference value that exceeds the pre-defined interference threshold; and
   establish communication between the short-range communication device and the mobile communication device in response to the occupant approaching the object determined to have a communication interference value that exceeds the pre-defined interference threshold.

3. The system of claim 1, wherein the controller is further configured to:
   determine an environmental factor; and
   determine the communication interference value associated with the object based on the determined parameter and the determined external environmental factor.

4. The system of claim 3, the external environmental factor is selected from the group consisting of precipitation, humidity, temperature, cloud cover, and wind speed.

5. The system of claim 1, wherein pre-establishing communication between the short-range communication device and the mobile communication device comprises transmitting a device information selected form a group consisting of a universally unique identifier (UUID) of the short-range communication device to the mobile communication device, authentication information, authorization information, encryption information, and pairing list information.

6. The system of claim 1, wherein the mobile communication device is configured to operate in at least one network selected from the group consisting of a Wi-Fi network, an LTE network, a 5G network, and an LMR network.

7. The system of claim 1, wherein the parameter associated with the detected object is selected from the group consisting of a distance to the detected object from the vehicle, a material of the detected object, and a size of the detected object.

8. A method for dynamically switching between a vehicle communication network associated with a vehicle and a personal communication network, comprising:
   receiving sensor data associated with an object external to the vehicle at a vehicle controller;
   determining, at the vehicle controller, a parameter of the object;
   determining, at the vehicle controller, a communication interference value associated with the object based on the determined parameter; and
   pre-establishing communication between a short-range communication device and a mobile communication device associated with a user in response to determining that the communication interference value exceeds a pre-defined interference level while maintaining communication between the short-range communication device and a vehicle-based long-range communication device.

9. The method of claim 8, further comprising:
   detecting, at the vehicle controller, the occupant of the vehicle approaching the object determined to have a communication interference value that exceeds the pre-defined interference level; and
   establishing communication between the short-range communication device and the mobile communication device at the vehicle controller in response to the occupant approaching the object determined to have a communication interference value that exceeds the pre-defined interference level.

10. The method of claim 8, further comprising:
    determining, at the vehicle controller, an external environmental factor; and
    determining, at the vehicle controller, the communication interference value associated with the object based on the determined parameter and the determined external environmental factor.

11. The method of claim 10, wherein the external environmental factor is selected from the consisting of precipitation, humidity, temperature, cloud cover, and wind speed.

12. The method of claim 8, wherein pre-establishing communication between the short-range communication device and the mobile communication device comprises transmitting a device universally unique identifier (UUID) of the short-range communication device to the mobile communication device.

13. The method of claim 8, further comprising:
    detecting, at the vehicle controller, the occupant re-entering the vehicle; and
    re-establishing communication between the short-range communication device and the vehicle-based long-range communication device in response to detecting the occupant re-entering the vehicle.

14. The method of claim 8, further comprising generating an electronic message to be presented to the occupant in response to pre-establishing communication between the short-range communication device and the mobile device, wherein the electronic message indicates that communication has been pre-established between the mobile communication device and the short-range communication device.

15. A mobile communication system, comprising:
    a short-range communication device;
    a mobile communication device having long-range communication capabilities;
    a vehicle-based communication device, wherein the vehicle-based communication device is configured to communicate with the short-range communication device;
    a sensor configured to generate sensor data; and
    an electronic processor connected to the sensor and configured to:
    receive the sensor data, wherein the sensor data is associated with scene external to a vehicle;

detect a visual object based on the received sensor data;
determine a parameter associated with the visual object based on the received sensor data;

determine an external environmental factor;

determine a communication interference value associated with the visual object based on the determined parameter and the determined external environmental factor, wherein the communication interference value represents a probability of communication between the short-range communication device and the vehicle-based communication device being lost upon the short-range communication device approaching the visual object; and pre-establish communication between the short-range communication device and the mobile communication devices in response to determining that the communication interference value exceeds a pre-defined interference level.

16. The system of claim 15, wherein the electronic processor is further configured to:

detect an occupant of the vehicle approaching the visual object determined to have a communication interference value that exceeds the pre-defined interference level; and establish communication between the short-range communication device and the mobile communication device in response to the occupant exiting the vehicle and approaching the visual object determined to have a communication interference value that exceeds the pre-defined interference level.

17. The system of claim 16, wherein the electronic processor is further configured to:

detect the occupant re-entering the vehicle; and re-establish communication between the short-range communication device and the vehicle-based communication device in response to detecting the occupant re-entering the vehicle.

18. The system of claim 15, wherein pre-establishing communication between the short-range communication device and the mobile communication device comprises transmitting a MAC address of the short-range communication device to the mobile communication device, Short-range communication cover, but not limited to, Bluetooth, Wi-Fi, ZigBee, low energy ultra-wideband, or infrared, etc.

19. The system of claim 15, wherein the sensor is selected from a list consisting of a LIDAR sensor, a RADAR sensor, a multi-spectrum camera, a dashboard camera, a license plate recognition camera, and a microphone.

20. The system of claim 15, wherein the short-range communication device utilizes a communication protocol selected from a list consisting of Bluetooth, Wi-Fi, ZigBee, low energy ultra-wideband, and infrared.

* * * * *